US010539484B2

(12) United States Patent
Powell et al.

(10) Patent No.: US 10,539,484 B2
(45) Date of Patent: Jan. 21, 2020

(54) SYSTEMS AND METHODS FOR MEASURING A CORNER TRAVEL INDEX

(71) Applicants: Douglas H. Powell, El Dorado Hills, CA (US); Aaron Colacchia, Rancho Cordova, CA (US); Blake Martin, Rancho Cordova, CA (US)

(72) Inventors: Douglas H. Powell, El Dorado Hills, CA (US); Aaron Colacchia, Rancho Cordova, CA (US); Blake Martin, Rancho Cordova, CA (US)

( * ) Notice: Subject to any disclaimer, the term of this patent is extended or adjusted under 35 U.S.C. 154(b) by 160 days.

(21) Appl. No.: 15/893,309

(22) Filed: Feb. 9, 2018

(65) Prior Publication Data

US 2019/0250068 A1 Aug. 15, 2019

(51) Int. Cl.
*G01M 17/04* (2006.01)

(52) U.S. Cl.
CPC ................... *G01M 17/04* (2013.01)

(58) Field of Classification Search
CPC .................................................. G01M 17/04
USPC ....... 73/117.01, 117.02, 117.03, 118.01, 669
See application file for complete search history.

(56) References Cited

U.S. PATENT DOCUMENTS

| 5,820,150 A * | 10/1998 | Archer .................... B60G 3/20 280/124.138 |
| 2007/0067112 A1* | 3/2007 | Fiedler ................ B60G 17/016 702/33 |
| 2008/0007022 A1* | 1/2008 | Jones ....................... B60G 3/10 280/124.13 |
| 2011/0084503 A1* | 4/2011 | Li ........................ B60G 17/019 290/1 R |
| 2016/0060824 A1* | 3/2016 | Akashi .................... E01C 23/01 348/148 |
| 2017/0158016 A1* | 6/2017 | Hahn ................. B60G 17/0155 |

* cited by examiner

*Primary Examiner* — Eric S. McCall
(74) *Attorney, Agent, or Firm* — Dodd Call Black, PLLC; Dustin Call

(57) ABSTRACT

A method for measuring a corner travel index for a vehicle. The method includes elevating a first tire on the vehicle and a second tire on the vehicle from a horizontal plane defining a ground level, where the first tire is opposite the second tire. The method further includes ceasing to raise the first tire and the second tire at the highest point at which any non-elevated tires remain on the ground level and measuring the vertical clearance between the ground level and the lowest point of the first tire. The method additionally includes measuring the vertical clearance between the ground level and the lowest point of the second tire and calculating a corner travel index.

20 Claims, 4 Drawing Sheets ic # SYSTEMS AND METHODS FOR MEASURING A CORNER TRAVEL INDEX

CROSS-REFERENCE TO RELATED APPLICATIONS

Not applicable.

BACKGROUND OF THE INVENTION

Ramp travel index or RTI, is a way of measuring a vehicle's ability to flex its suspension, a property also known as axle articulation. The RTI rating is used mainly in the off-roading industry to test and describe chassis limits of modified vehicles. The method for measuring RTI is not standardized. However, normally, the ramps vary between 15 and 30 degrees of angle for the vehicle to ride up. "Ramping" a vehicle involves putting one front tire on the ramp and driving up slowly until one of the other three tires (usually the rear one on the same side as the tire driving the ramp) begins to leave the ground. The measurement is only taken when the other three tires are still on the ground. The distance traveled up the ramp is then measured and is divided by the vehicle's wheelbase and finally multiplied by 1000 to give a final RTI score. Most stock SUVs have RTI values from 400 to 550; vehicles modified for off-road competition have the ability to exceed 1000.

However, the RTI suffers from a number of drawbacks. For example, the ramp angle can vary which leads to inconsistencies (for example, the same vehicle can have an RTI of 1033 when measured on a 20-degree ramp, an RTI of 836 when measured on a 25-degree ramp and an RTI of 706 when measured on a 30 degree ramp). E.g., some vehicles may have a higher RTI compared to other vehicles at a low ramp angle but a lower RTI compared to the same vehicles at a high ramp angle. Further, there isn't a standard for certain vehicle characteristics, such as tire pressure, to ensure consistency across measurements. In addition, driver skill can influence the final RTI. Moreover, the location of where measurement occurs is not standardized. I.e., any one of closest point of contact to the bottom of the ramp, farthest point of contact to the bottom of the ramp, center point of contact to the bottom of the ramp, the point on the ramp matching the height of the axle and the lowest point of the tire on the ramp may all be measured and used to calculate the RTI. Finally, other factors, such as direction which the vehicle is driven (forward or reverse), approach angle and weight distribution all may change the value of the RTI. All of these inconsistencies mean that RTI is not an inherent characteristic of axle articulation.

In addition, measuring RTI is an inherently unsafe procedure. Obviously, a mistake in driving can lead to the vehicle coming of the ramp which has the potential to injure both the driver and bystanders. Further, the vehicle can move when the vehicle is put into or taken out of gear, when the brakes are engaged or when the vehicle is shut off. Each of these can lead to changes in measurement and/or safety hazards.

Accordingly, there is a need in the art for an axle articulation measurement that is free of inconsistencies (i.e., that gives repeatable results). Further, there is a need in the art for an axle articular measurement that is safe for both the driver and bystanders.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a method for measuring a corner travel index for a vehicle. The method includes elevating a first tire on the vehicle and a second tire on the vehicle from a horizontal plane defining a ground level, where the first tire is opposite the second tire. The method further includes ceasing to raise the first tire and the second tire at the highest point at which any non-elevated tires remain on the ground level and measuring the vertical clearance between the ground level and the lowest point of the first tire. The method additionally includes measuring the vertical clearance between the ground level and the lowest point of the second tire and calculating a corner travel index.

Another example embodiment includes a method for measuring a corner travel index for a vehicle. The method includes setting all tire pressures on a vehicle to a standard pressure. The method also includes elevating a first tire on the vehicle and a second tire on the vehicle from a horizontal plane defining a ground level, where the first tire is opposite the second tire. The method further includes ceasing to raise the first tire and the second tire at the highest point at which a third tire and a fourth tire remain on the ground level, where the third tire is opposite the fourth tire and measuring the vertical clearance between the ground level and the lowest point of the first tire. The method additionally includes measuring the vertical clearance between the ground level and the lowest point of the second tire. The method moreover includes elevating the third tire on the vehicle and the fourth tire on the vehicle from the ground level and ceasing to raise the third tire and the fourth tire at the highest point at which a first tire and a second tire remain on the ground level. The method also includes measuring the vertical clearance between the ground level and the lowest point of the third tire and measuring the vertical clearance between the ground level and the lowest point of the fourth tire. The method additionally includes calculating a corner travel index.

Another example embodiment includes a method for measuring a corner travel index for a vehicle. The method includes setting all tire pressures on a vehicle to a standard pressure of approximately 15 psi. The method additionally includes placing the vehicle on a corner travel index trailer. The corner travel index trailer includes a deck, where the deck is large enough to accommodate the vehicle and a first powered lift, where the first powered lift includes a first platform, the first platform being level with the deck. The corner travel index trailer also includes a second powered lift, where the second powered lift includes a second platform, the second platform being level with the deck and a third powered lift, where the third powered lift includes a third platform, the third platform being level with the deck. The corner travel index trailer further includes a fourth powered lift, where the fourth powered lift includes a fourth platform, the fourth platform being level with the deck and one or more controls, where the one or more control govern operation of the first powered lift, second powered lift, third powered lift and fourth powered lift. The first powered lift, the second powered lift, third powered lift, and fourth powered lift are configured to be operated independent of one another. The method also includes elevating a first tire on the vehicle and a second tire on the vehicle from a horizontal plane including the deck, where the first tire is opposite the second tire. The method further includes ceasing to raise the first tire and the second tire at the highest point at which a third tire and a fourth tire remain on the deck, where the third tire is opposite the fourth tire and measuring the vertical clearance between the deck and the lowest point of the first tire. The method additionally includes measuring the vertical clearance between the deck and the lowest point of the second tire. The method moreover includes elevating the third tire on the vehicle and the fourth tire on the vehicle from the deck and ceasing to raise the third tire and the fourth tire at the highest point at which a first tire and a second tire remain on the deck. The method also includes measuring the vertical clearance between the ground level and the lowest point of the third tire and measuring the vertical clearance between the ground level and the lowest point of the fourth tire. The method additionally includes calculating a corner travel index.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
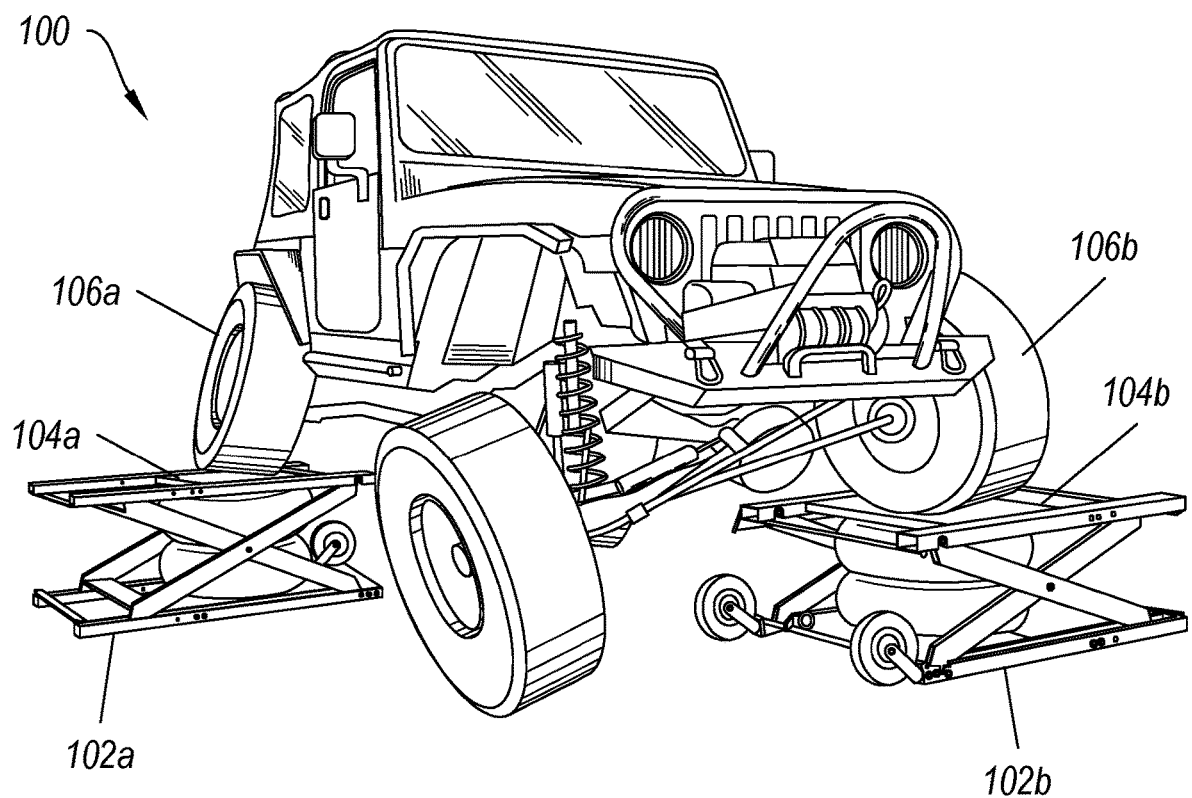
FIG. 1 illustrates an example for a corner travel index ("CTI") measuring system.

FIG. 1 illustrates an example for a corner travel index ("CTI") measuring system 100. A CTI is a measure of a vehicle's maximum axle/wheel articulation at the four corners of the vehicle (which can be referred to as "flex"). I.e., the CTI is used to quantify the axle/wheel articulation to compare the performance potential of a wide variety of vehicles and vehicle builds.

FIG. 1 shows that the CTI measuring system 100 can include a first lift 102a and a second lift 102b (collectively "lifts 102"). The lifts 102 include any a device or apparatus for lifting a portion of a vehicle. In particular, the lifts 102 allow for lifting portions of a vehicle in accordance with the procedure described below. For example, the lifts 102 can include powered lifts, hydraulic lifts, pneumatic lifts, electro-mechanical lifts, fork lifts, jack stands, floor jacks, scissor jacks, hydraulic bottle jacks or any other desired type of lift or jack.

FIG. 1 shows that the CTI measuring system 100 can include a first platform 104a and a second platform 104b (collectively "platforms 104"). The first platform 104a is attached to the first lift 102a and the second platform 104b is attached to the second lift 102b. The platforms 104 allow a user to place tires 106 from a vehicle on the lifts 102. In particular, a user can drive such that a first tire 106a is on the first platform 104a and a second tire 106b is on the second platform 104b (where the second tire is opposite the first tire in accordance with the method disclosed below).

Figure 2:
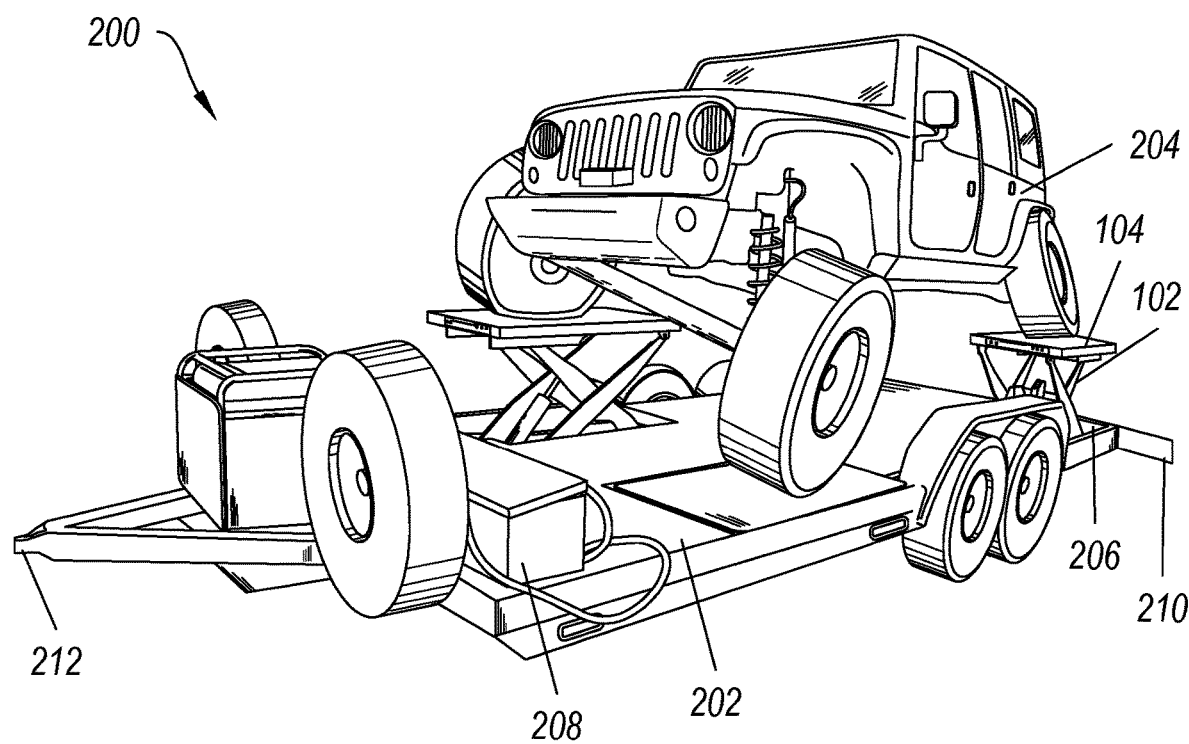
FIG. 2 illustrates an example of a CTI trailer.

FIG. 2 illustrates an example of a CTI trailer 200. The CTI trailer 200 is a mobile system for measuring CTI. A vehicle with a higher CTI offers greater axle/wheel articulation and therefore greater potential off-road performance over extreme terrain and obstacles. A vehicle with a higher CTI will maintain more constant wheel contact with the ground while traveling over extreme terrain and obstacles. This ensures that all wheels deliver torque or traction to the ground surface maintaining the vehicle's ability to move. The CTI trailer 200 allows for measuring of CTI wherever vehicles are located.

FIG. 2 shows that the CTI trailer 200 can include a deck 202. The deck 202 includes a flat or mostly flat surface that is large enough to accommodate the vehicle 204 being measured. I.e., the deck 202 is large enough that the vehicle 204 can be driven onto the CTI trailer 200 for measurement of a CTI score. The deck 202 can be made of any desired material, such as metal or wood, which is sufficiently strong to support the weight of the vehicle 204.

FIG. 2 also shows that the CTI trailer 200 can include one or more openings 206 in the deck 202. The openings 206 allow the lifts 102 to extend through the deck 202 such that the platforms 104 are elevated relative to the deck 204. That is, the openings allow for operation of the lifts 102 such that the platforms 104 are either level with the deck 202 or raised above the deck 202 to allow the CTI measurement to occur.

FIG. 2 further shows that the CTI trailer 200 can include one or more controls 208. The controls 208 allow a user to operate the CTI trailer 200. In particular, the controls 208 allow for lifting of platforms 104 during measurement of a CTI measurement. The controls 208 may allow for manual or automatic control of any of the lifts 102 or some combination thereof. For example, the controls 208 can allow a user to move one lift 102 independently. In contrast, the controls 208 can allow a user to begin a sequence which will operate independently and output a CTI as described below.

FIG. 2 additionally shows that the CTI trailer 200 can include a ramp 210. The ramp 210 is configured to allow a user to drive vehicle 204 onto the deck 202. I.e., the ramp 210 allows the vehicle 204 to be driven into a position where the CTI of the vehicle 204 can be measured. One of skill in the art will appreciate that the ramp 210 can be stored or removed so that the CTI trailer 200 can be driven to a desired location. As used in the specification and the claims, the phrase "configured to" denotes an actual state of configuration that fundamentally ties recited elements to the physical characteristics of the recited structure. That is, the phrase "configured to" denotes that the element is structurally capable of performing the cited element but need not necessarily be doing so at any given time. Thus, the phrase "configured to" reaches well beyond merely describing functional language or intended use since the phrase actively recites an actual state of configuration.

FIG. 2 moreover shows that the CTI trailer 200 can include a hitch 212. The hitch 212 allows the CTI trailer 200 to be towed to a desired location. In particular, the hitch 212 allows a user to connect the CTI trailer 200 to a vehicle which may then drive to the desired location towing the CTI trailer 200.

Figure 3:
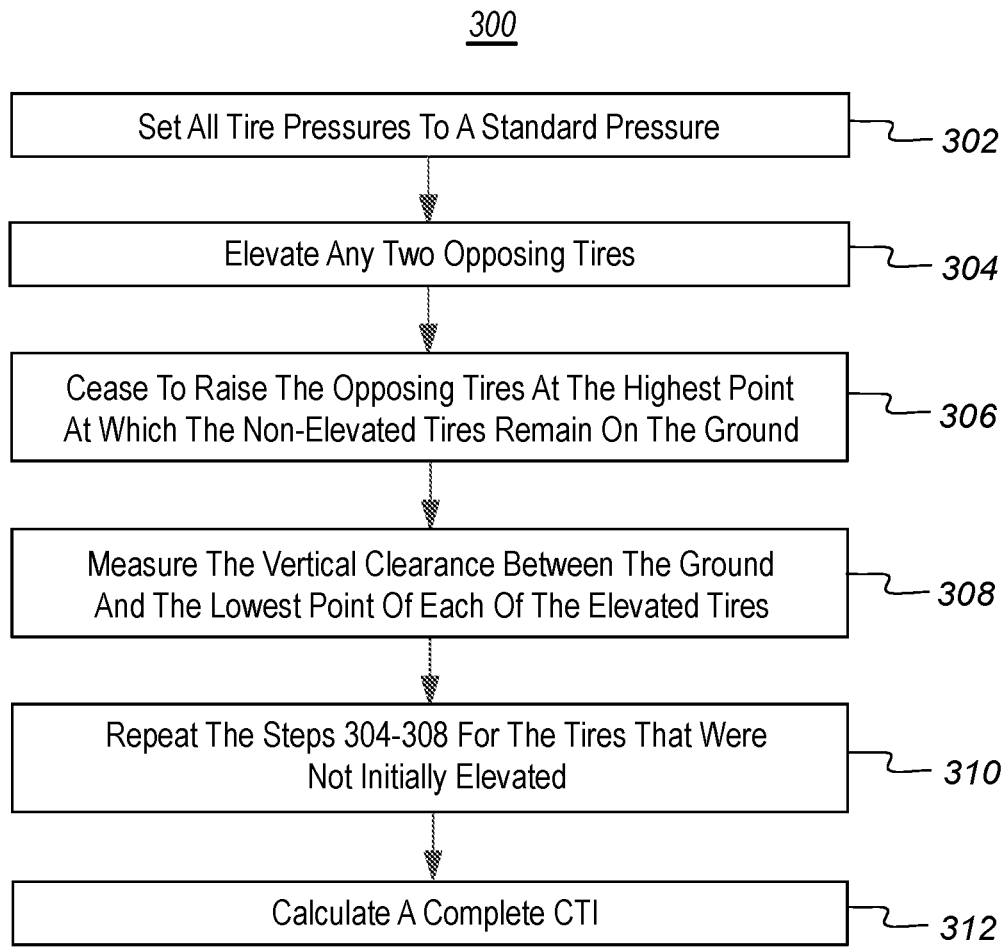
FIG. 3 is a flow chart illustrating a method of obtaining a complete CTI.

FIG. 3 is a flow chart illustrating a method 300 of obtaining a complete CTI. In at least one implementation, the complete CTI can be obtained using the CTI trailer 200 of FIG. 2. Therefore, the method 300 will be described, exemplarily, with reference to the CTI trailer 200 of FIG. 2. Nevertheless, one of skill in the art can appreciate that the method 300 can be used with systems other than the CTI trailer 200 of FIG. 2.

FIG. 3 shows that the method 300 can include setting 302 all tire pressures to a standard pressure. I.e., all tires on the vehicle are set 302 to a tire pressure that is predetermined. For example, the tire pressure can be set to approximately 15 psi. This can be critical to set a standard for consistent measurement across a wide variety of vehicles and builds. As used in the specification and the claims, the term approximately shall mean that the value is within 10% of the stated value, unless otherwise specified.

FIG. 3 also shows that the method 300 can include elevating 304 any two opposing tires. For example, the front passenger tire ("FPT") and the rear driver tire ("RDT") may be simultaneously elevated 304 (or the front driver tire—"FDT"—and the rear passenger tire—"RPT"). This can be done with a pair of lifts (such as in FIG. 1 or FIG. 2) or other mechanical means (such as forklifts). One of skill in the art will appreciate that elevating is done relative to the surface on which the vehicle is resting. For example, using only the lifts 102 of FIG. 1, the FPT and RDT are elevated 304 relative to the ground. Likewise, using the CTI trailer 200 of FIG. 2, the FPT and RDT are elevated 304 relative to the deck 202. As used hereinafter "ground" shall refer to the non-elevated surface on which the vehicle is resting.

FIG. 3 further shows that the method 300 can including ceasing 306 to raise the opposing tires at the highest point at which the non-elevated tires remain on the ground. So, for example, if the FPT and RDT are being elevated 304, then the raising ceases 306 at the highest point at which the FDT and RPT remain on the ground. One of skill in the art will appreciate that the ceasing 306 may occur at different heights for the opposing tires. For example, if the FPT and RDT are being elevated 304 then the elevation 304 of the FPT may need to be ceased 306 at a higher (or lower) height than the RDT.

FIG. 3 additionally shows that the method 300 can include measuring 308 the vertical clearance between the ground and the lowest point of each of the elevated tires. For standardization purposes, the measurement is done in, or converted to, inches. However, since the CTI is for comparison purposes, the measurement can be done using any other linear dimension. In the example above, the vertical clearance, in inches may be measured between the ground and the lowest point of the FPT and RDT. One of skill in the art will appreciate that the measurement may be done automatically. For example, the vertical difference between the platforms 104 and the deck 202 of the CTI trailer 200 can be automatically measured (or calculated) by the controls 208.

FIG. 3 moreover shows that the method 300 can include repeating 310 the steps 304-308 for the tires that were not initially elevated 304. For example, if the FPT and RDT where initially elevated 304 then the steps 304-308 are now repeated for the FDT and RPT. Thus, the vertical clearance for each of the four tires is obtained.

FIG. 3 also shows that the method 300 can include calculating 312 a complete CTI. The complete CTI is calculated 312 using the following equation:

$$(FPT+RDT+FDT+RPT) \times 10 = \text{Complete CTI} \qquad \text{Equation 1}$$

where FPT is the measured clearance of the front passenger tire, RDT is the measured clearance of the rear driver tire, FDT is the measured clearance of the front driver tire, and RPT is the measured clearance of the rear passenger tire. For example, if FPT is measured as 19½ inches, RDT is measured as 18¾ inches, FDT is measured as 19¼ inches and RPT is measured as 18½ inches, the complete CTI is calculated 312 as:

$$(19\tfrac{1}{2}+18\tfrac{3}{4}+19\tfrac{1}{4}+18\tfrac{1}{2}) \times 10 = 760.$$

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
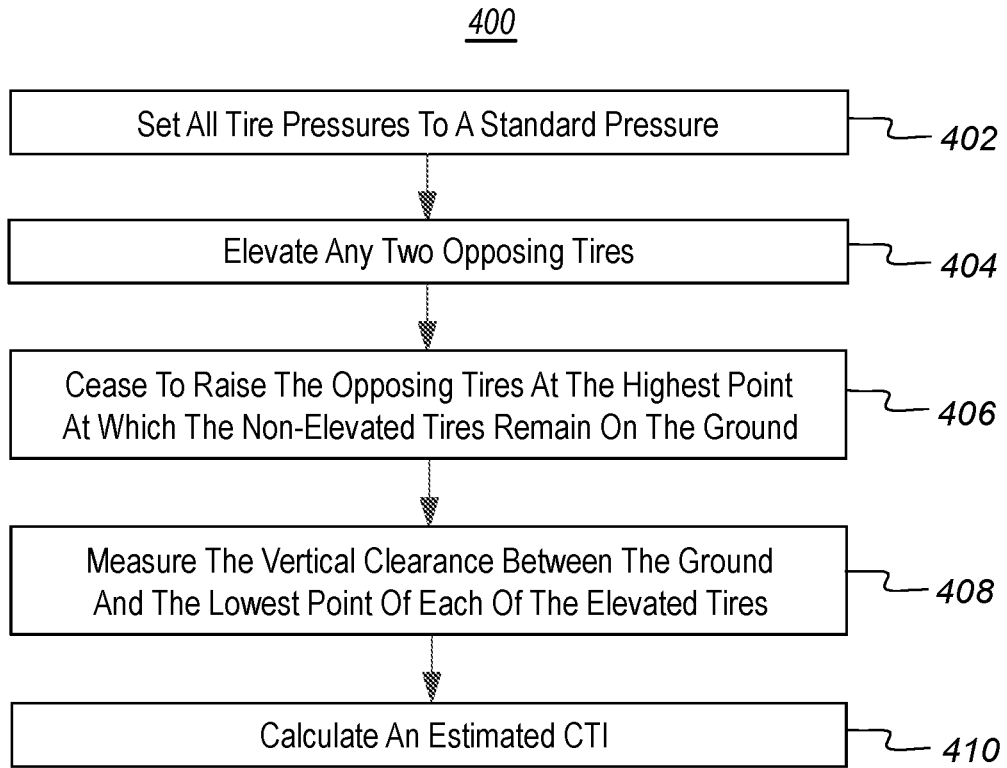
FIG. 4 is a flow chart illustrating a method of obtaining an estimated CTI.

FIG. 4 is a flow chart illustrating a method 400 of obtaining an estimated CTI. The estimated CTI is similar to the complete CTI but may be quicker. In at least one implementation, the estimate CTI can be obtained using the CTI trailer 200 of FIG. 2. Therefore, the method 400 will be described, exemplarily, with reference to the CTI trailer 200 of FIG. 2. Nevertheless, one of skill in the art can appreciate that the method 400 can be used with systems other than the CTI trailer 200 of FIG. 2.

FIG. 4 shows that the method 400 can include setting 402 all tire pressures to a standard pressure. I.e., all tires on the vehicle are set 402 to a tire pressure that is predetermined. For example, the tire pressure can be set to approximately 15 psi. This can be critical, as in the method 300 for measuring complete CTI, to set a standard for consistent measurement across a wide variety of vehicles and builds.

FIG. 4 also shows that the method 400 can include elevating 404 any two opposing tires. For example, the FPT and RDT may be simultaneously elevated 404 (or the front driver tire—FDT and the rear passenger tire—RPT). This can be done with a pair of lifts (such as in FIG. 1 or FIG. 2) or other mechanical means (such as forklifts). One of skill in the art will appreciate that elevating is done relative to the surface on which the vehicle is resting. For example, using only the lifts 102 of FIG. 1, the FPT and RDT are elevated 404 relative to the ground. Likewise, using the CTI trailer 200 of FIG. 2, the FPT and RDT are elevated 404 relative to the deck 202. As used hereinafter "ground" shall refer to the non-elevated surface on which the vehicle is resting.

FIG. 4 further shows that the method 400 can including ceasing 406 to raise the opposing tires at the highest point at which the non-elevated tires remain on the ground. So, for example, if the FPT and RDT are being elevated 404, then the raising ceases 406 at the highest point at which the FDT and RPT remain on the ground. One of skill in the art will appreciate that the ceasing 406 may occur at different heights for the opposing tires. For example, if the FPT and RDT are being elevated 404 then the elevation 404 of the FPT may need to be ceased 406 at a higher (or lower) height than the RDT.

FIG. 4 additionally shows that the method 400 can include measuring 408 the vertical clearance between the ground and the lowest point of each of the elevated tires. For standardization purposes, the measurement is done in, or converted to, inches. However, since the CTI is for comparison purposes, the measurement can be done using any other linear dimension. In the example above, the vertical clearance, in inches may be measured between the ground and the lowest point of the FPT and RDT. One of skill in the art will appreciate that the measurement may be done automatically. For example, the vertical difference between the platforms 104 and the deck 202 of the CTI trailer 200 can be automatically measured (or calculated) by the controls 208.

FIG. 4 also shows that the method 400 can include calculating 410 an estimated CTI. For example, the estimated CTI may be calculated 410 using the equation:

$$(FPT+RDT) \times 2 \times 10 = \text{Estimated CTI} \quad \text{Equation 2}$$

where FPT is the measured clearance of the front passenger tire and RDT is the measured clearance of the rear driver tire or using the equation:

$$(FDT+RPT) \times 2 \times 10 = \text{Estimated CTI} \quad \text{Equation 3}$$

where FDT is the measured clearance of the front driver tire, and RPT is the measured clearance of the rear passenger tire. For example, if FPT is measured as 19½ inches and RDT is measured as 18¾ inches, the estimated CTI is calculated 410 as:

$$(19\tfrac{1}{2} + 18\tfrac{3}{4}) \times 2 \times 10 = 765.$$

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for measuring a corner travel index for a vehicle, the method including:
    elevating a first tire on the vehicle and a second tire on the vehicle from a horizontal plane defining a ground level, wherein the first tire is opposite the second tire;
    ceasing to raise the first tire and the second tire at the highest point at which any non-elevated tires remain on the ground level;
    measuring the vertical clearance between the ground level and the lowest point of the first tire;
    measuring the vertical clearance between the ground level and the lowest point of the second tire; and
    calculating a corner travel index.

2. The method of claim 1, wherein the standard pressure is approximately 15 psi.

3. The method of claim 1, wherein:
    the first tire is the front driver tire; and
    the second tire is the rear passenger tire.

4. The method of claim 3, wherein the value of the corner travel index is calculated using the equation:

$$\text{corner travel index} = (FDT+RPT) \times 2 \times 10$$

where:
    FDT is the measured clearance of the front passenger tire; and
    RPT is the measured clearance of the rear driver tire.

5. The method of claim 1, wherein:
    the first tire is the front passenger tire; and
    the second tire is the rear driver tire.

6. The method of claim 5, wherein the value of the corner travel index is calculated using the equation:

$$\text{corner travel index} = (FPT+RDT) \times 2 \times 10$$

where:
    FPT is the measured clearance of the front passenger tire; and
    RDT is the measured clearance of the rear driver tire.

7. The method of claim 1, wherein:
    the first tire is elevated using a first lift; and
    the second tire is elevated using a second lift.

8. The method of claim 7,
    the first lift includes a first platform; and
    the second lift includes a second platform.

9. A method for measuring a corner travel index for a vehicle, the method including:
    setting all tire pressures on a vehicle to a standard pressure;
    elevating a first tire on the vehicle and a second tire on the vehicle from a horizontal plane defining a ground level, wherein the first tire is opposite the second tire;
    ceasing to raise the first tire and the second tire at the highest point at which a third tire and a fourth tire remain on the ground level, wherein the third tire is opposite the fourth tire;
    measuring the vertical clearance between the ground level and the lowest point of the first tire;
    measuring the vertical clearance between the ground level and the lowest point of the second tire; and
    elevating the third tire on the vehicle and the fourth tire on the vehicle from the ground level;
    ceasing to raise the third tire and the fourth tire at the highest point at which a first tire and a second tire remain on the ground level;
    measuring the vertical clearance between the ground level and the lowest point of the third tire;
    measuring the vertical clearance between the ground level and the lowest point of the fourth tire; and
    calculating a corner travel index.

10. The method of claim 9, wherein:
    the first tire is the front driver tire;
    the second tire is the rear passenger tire;
    the third tire is the front passenger tire; and
    the fourth tire is the rear driver tire.

11. The method of claim 9, wherein:
    the first tire is the front passenger tire;
    the second tire is the rear driver tire;
    the third tire is the front driver tire; and
    the fourth tire is the rear passenger tire.

12. The method of claim 9, wherein, wherein the value of the corner travel index is calculated using the equation:

$$\text{corner travel index} = (FPT+RDT+FDT+RPT) \times 10$$

where:
    FPT is the measured clearance of the front passenger tire;
    RDT is the measured clearance of the rear driver tire;
    FDT is the measured clearance of the front driver tire; and
    RPT is the measured clearance of the rear passenger tire.

13. The method of claim 9, wherein the height of the first tire when elevated is independent of the height of the second tire when elevated.

14. The method of claim 13, wherein the height of the third tire when elevated is independent of the height of the fourth tire when elevated.

15. A method for measuring a corner travel index for a vehicle, the method including:
 setting all tire pressures on a vehicle to a standard pressure of approximately 15 psi;
 placing the vehicle on a corner travel index trailer, wherein the corner travel index trailer includes:
  a deck, wherein the deck is large enough to accommodate the vehicle;
  a first powered lift, wherein the first powered lift includes a first platform, the first platform being level with the deck;
  a second powered lift, wherein the second powered lift includes a second platform, the second platform being level with the deck;
  a third powered lift, wherein the third powered lift includes a third platform, the third platform being level with the deck;
  a fourth powered lift, wherein the fourth powered lift includes a fourth platform, the fourth platform being level with the deck;
  one or more controls, wherein the one or more controls govern operation of the first powered lift, second powered lift, third powered lift and fourth powered lift;
  wherein the first powered lift, the second powered lift, third powered lift, and fourth powered lift are configured to be operated independent of one another;
 elevating a first tire on the vehicle and a second tire on the vehicle from the deck, wherein the first tire is opposite the second tire;
 ceasing to raise the first tire and the second tire at the highest point at which a third tire and a fourth tire remain on the deck, wherein the third tire is opposite the fourth tire;
 measuring the vertical clearance between the deck and the lowest point of the first tire;
 measuring the vertical clearance between the deck and the lowest point of the second tire; and
 elevating the third tire on the vehicle and the fourth tire on the vehicle from the deck;
 ceasing to raise the third tire and the fourth tire at the highest point at which a first tire and a second tire remain on the deck;
 measuring the vertical clearance between the deck and the lowest point of the third tire;
 measuring the vertical clearance between the deck and the lowest point of the fourth tire; and
 calculating a corner travel index.

16. The method of claim 15, wherein:
 the first powered lift is a hydraulic lift;
 the second powered lift is a hydraulic lift;
 the third powered lift is a hydraulic lift; and
 the fourth powered lift is a hydraulic lift.

17. The method of claim 15, wherein the trailer further includes:
 a ramp, the ramp configured to allow a user to drive the vehicle onto the deck of the trailer.

18. The method of claim 15, wherein the trailer further includes:
 a hitch, wherein the hitch is configured to allow the trailer to be towed by an automobile.

19. The method of claim 15, wherein the one or more controls include a display, wherein the display indicates the height relative to the deck of each of:
 the first platform;
 the second platform;
 the third platform; and
 the fourth platform.

20. The method of claim 15, wherein the trailer further includes:
 one or more openings in the deck, wherein the one or more openings allows:
  the first lift to extend through the deck;
  the second lift to extend through the deck;
  the third lift to extend through the deck; and
  the fourth lift to extend through the deck.

* * * * *